(12) United States Patent
Gao et al.

(10) Patent No.: US 10,948,874 B2
(45) Date of Patent: Mar. 16, 2021

(54) HOLOGRAPHIC IMAGING METHOD, HOLOGRAPHIC IMAGING DEVICE, HOLOGRAPHIC IMAGING SYSTEM, AND STORAGE MEDIUM

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 180 days.

(21) Appl. No.: 16/029,614

(22) Filed: Jul. 8, 2018

(65) Prior Publication Data

US 2019/0204781 A1 Jul. 4, 2019

(30) Foreign Application Priority Data

Jan. 4, 2018 (CN) .......................... 201810007278.X

(51) Int. Cl.
*G03H 1/04* (2006.01)
*G02F 1/139* (2006.01)
(Continued)

(52) U.S. Cl.
CPC .......... *G03H 1/0486* (2013.01); *G02F 1/1396* (2013.01); *G02F 1/13439* (2013.01);
(Continued)

(58) Field of Classification Search
CPC ...... G03H 1/0486; G03H 1/02; G03H 1/2294; G03H 2001/0224; G03H 2225/55; G03H 2225/22; G03H 2222/12; G03H 2222/53; G03H 2223/19; G03H 2223/22; G03H 2225/31; G03H 2001/0204;
(Continued)

(56) References Cited

U.S. PATENT DOCUMENTS 10,234,696 B2 * 3/2019 Popovich .............. G02B 27/48
2002/0093743 A1 * 7/2002 Miyamae .......... G02F 1/133555
359/619

(Continued)

FOREIGN PATENT DOCUMENTS

CN 106154800 A 11/2016
CN 106292240 A 1/2017
(Continued)

OTHER PUBLICATIONS

First Chinese Office Action dated Feb. 25, 2020, received for corresponding Chinese Application No. 201810007278.X, 14 pages.

*Primary Examiner* — Jade R Chwasz
(74) *Attorney, Agent, or Firm* — Kinney & Lange, P.A.

(57) ABSTRACT

A holographic imaging device includes a laser device, a laser beam expanding and collimating system and a liquid crystal cell. The laser beam expanding and collimating system is configured to expand a light beam from the laser device and enable the expanded light beam to be transmitted substantially vertically to the liquid crystal cell. An amplitude-transmission coefficient distribution of the liquid crystal cell is determined in accordance with a brightness distribution of holographic interference fringes of an object to be displayed.

17 Claims, 11 Drawing Sheets

(51) Int. Cl.
*G02F 1/1335* (2006.01)
*G02F 1/1343* (2006.01)
*G03H 1/02* (2006.01)
*G03H 1/22* (2006.01)
*G02F 1/1333* (2006.01)

(52) U.S. Cl.
CPC .. *G02F 1/133526* (2013.01); *G02F 1/133528* (2013.01); *G03H 1/02* (2013.01); *G03H 1/2294* (2013.01); *G02F 1/133302* (2021.01); *G02F 1/133562* (2021.01); *G02F 1/133567* (2021.01); *G02F 2203/12* (2013.01); *G03H 2001/0204* (2013.01); *G03H 2001/0224* (2013.01); *G03H 2001/0491* (2013.01); *G03H 2222/12* (2013.01); *G03H 2222/53* (2013.01); *G03H 2223/19* (2013.01); *G03H 2223/22* (2013.01); *G03H 2225/22* (2013.01); *G03H 2225/31* (2013.01); *G03H 2225/55* (2013.01)

(58) Field of Classification Search
CPC ............. G03H 2001/0491; G03H 1/22; G03H 2001/0212; G02F 1/1396; G02F 1/133528; G02F 1/13439; G02F 1/133526; G02F 2001/133302; G02F 2001/133562; G02F 2001/133567; G02F 2203/12
USPC ........................................................ 359/30
See application file for complete search history.

(56) References Cited

U.S. PATENT DOCUMENTS

| | | | |
|---|---|---|---|
| 2007/0008617 | A1* | 1/2007 | Shestak ............ G02F 1/133526 359/455 |
| 2007/0285775 | A1 | 12/2007 | Lesage et al. |
| 2011/0255170 | A1* | 10/2011 | Yamada ............... G02B 5/0236 359/619 |
| 2018/0067456 | A1 | 3/2018 | Zhang et al. |
| 2019/0339648 | A1 | 11/2019 | Gao et al. |
| 2020/0081262 | A1 | 3/2020 | Tan et al. |

FOREIGN PATENT DOCUMENTS

| | | |
|---|---|---|
| CN | 106338905 A | 1/2017 |
| CN | 106940486 A | 7/2017 |
| CN | 107462999 A | 12/2017 |

\* cited by examiner

HOLOGRAPHIC IMAGING METHOD, HOLOGRAPHIC IMAGING DEVICE, HOLOGRAPHIC IMAGING SYSTEM, AND STORAGE MEDIUM

CROSS-REFERENCE TO RELATED APPLICATION

The present application claims a priority of the Chinese patent application No. 201810007278.X filed on Jan. 4, 2018, which is incorporated herein by reference in its entirety.

TECHNICAL FIELD

The present disclosure relates to the field of imaging technology, i.e., holographic imaging technology, in particular to a holographic imaging method, a holographic imaging device, a holographic imaging system and a storage medium.

BACKGROUND

For a conventional holographic plate, amplitude information and phase information about an object optical wave are recorded in the form of contrast and brightness change in interference fringes, and then the information is processed, e.g., developed and fixed, so as to form irregular interference fringes, i.e., a holographic image. Hence, a conventional holographic imaging device is equivalent to an amplitude-type diffraction grating. However, it is impossible for the conventional holographic imaging device to adjust and modify the resultant holographic image effectively, so it is difficult to optimize an imaging effect, let alone the formation of a dynamic holographic image.

SUMMARY

In one aspect, the present disclosure provides in some embodiments a holographic imaging device, including a laser device, a laser beam expanding and collimating system and a liquid crystal cell. The laser beam expanding and collimating system is configured to expand a light beam from the laser device and enable the expanded light beam to be transmitted substantially vertically to the liquid crystal cell. An amplitude-transmission coefficient distribution of the liquid crystal cell is determined in accordance with a brightness distribution of holographic interference fringes of an object to be displayed.

In a possible embodiment of the present disclosure, the liquid crystal cell further includes two microlens array layers arranged at two outer surfaces of the liquid crystal cell respectively, and the two microlens array layers include a first microlens array layer and a second microlens array layer.

In a possible embodiment of the present disclosure, the first microlens array layer is arranged at a light-entering side, and each lens unit of the first microlens array layer is located at an opening area of a corresponding pixel. The second microlens array layer is arranged at a light-exiting side, and each lens unit of the second microlens array layer is located on an entire subpixel of a corresponding pixel.

In a possible embodiment of the present disclosure, the first microlens array layer and the second microlens array layer form an afocal system.

In a possible embodiment of the present disclosure, the liquid crystal cell is in a twisted nematic (TN) mode, an in-plane switching (IPS) mode or a fringe field switching (FFS) mode.

In a possible embodiment of the present disclosure, in the case that the liquid crystal cell is in the TN mode, the liquid crystal cell includes a first polarizer, a first glass substrate arranged on the first polarizer, a first transparent electrode layer arranged on the first glass substrate, a second polarizer, a second glass substrate arranged on the second polarizer, a second transparent electrode layer arranged on the second glass substrate, and a liquid crystal layer arranged between the first transparent electrode layer and the second transparent electrode layer. The light beam from the laser beam expanding and collimating system is transmitted substantially vertically toward the first polarizer, so as to enable the first transparent electrode layer and the second transparent electrode layer to control a deflection direction of liquid crystal molecules in the liquid crystal layer, thereby to achieve the amplitude-transmission coefficient distribution.

In a possible embodiment of the present disclosure, a back focus of each lens unit of the first microlens array layer substantially coincides with a front focus of a corresponding lens unit of the second microlens array layer.

In a possible embodiment of the present disclosure, an aperture of each lens unit of the first microlens array layer corresponds to the opening area of each pixel, and an aperture of each lens unit of the second microlens array layer corresponds to each pixel.

In a possible embodiment of the present disclosure, each of the first microlens array layer and the second microlens array layer includes a Fresnel microlens array.

In a possible embodiment of the present disclosure, the first microlens array layer has microlenses at an amount identical to the second microlens array layer, and an optical axis of each microlens of the first microlens array layer corresponds to an optical axis of a corresponding microlens of the second microlens array layer.

In another aspect, the present disclosure provides in some embodiments a holographic imaging method, including steps of: determining an amplitude-transmission coefficient distribution of the above-mentioned holographic imaging device in accordance with a brightness distribution of holographic interference fringes of an object to be displayed; and enabling the above-mentioned holographic imaging device to display a holographic image in accordance with the amplitude-transmission coefficient distribution.

In a possible embodiment of the present disclosure, the step of determining the amplitude-transmission coefficient distribution of the holographic imaging device in accordance with the brightness distribution of the holographic interference fringes includes: determining the brightness distribution of the holographic interference fringes of the object to be displayed; and enabling an amplitude-transmission coefficient distribution of the above-mentioned holographic imaging device to be substantially identical to the brightness distribution of the holographic interference fringes of the object to be displayed.

In a possible embodiment of the present disclosure, the step of determining the brightness distribution of the holographic interference fringes of the object to be displayed includes: sampling the object to be displayed, and determining a plurality of sampling points in the object to be displayed; determining a brightness distribution of the holographic interference fringes with respect to one sampling point; and performing a translation operation in accordance with the brightness distribution of the holographic interference fringes with respect to the sampling point, and determining a brightness distribution of the holographic interference fringes with respect to each of the remaining sampling points in the object to be displayed.

In a possible embodiment of the present disclosure, among the sampling points, a distance between every two of the sampling points at an identical imaging depth is smaller than a limiting visual resolution of a human eye, and a difference between parallax angles of every two of the sampling points at different imaging depths is greater than or equal to a stereoscopic acuity of the human eye.

In a possible embodiment of the present disclosure, the amplitude-transmission coefficient distribution varies in the form of a cosine function.

In a possible embodiment of the present disclosure, the brightness distribution of the holographic interference fringes with respect to each sampling point in the object to be displayed is a Fresnel zone.

In a possible embodiment of the present disclosure, the step of determining the amplitude-transmission coefficient distribution of the holographic imaging device in accordance with the brightness distribution of the interference fringes of the object to be displayed includes: sampling the object to be displayed, and determining a plurality of sampling points in the object to be displayed; and calculating an amplitude-transmission coefficient distribution of a holographic image with respect to each sampling point using the following formula:

$$t(x, y) = (|a_0|^2 + 1) + 2a_0 \cos\left[\frac{k}{2D}(x^2 + y^2)\right],$$

where $k=2\pi/\lambda$, $a_0$ represents a complex amplitude of a spherical wave which is generated by the sampling point and which has travelled to a receiving plane, and D represents a distance between the sampling point and a liquid crystal cell.

In a possible embodiment of the present disclosure, the step of determining the amplitude-transmission coefficient distribution of the holographic imaging device in accordance with the brightness distribution of the interference fringes of the object to be displayed includes: sampling the object to be displayed, and determining a plurality of sampling points in the object to be displayed; and calculating an amplitude-transmission coefficient distribution of a holographic image with respect to each sampling point using the following formula:

$$t(x, y) = (|a_0|^2 + 1) + 2a_0 \cos\left[\frac{k}{2D}(x^2 + y^2) - kx\sin\alpha\right],$$

where $k=2\pi/\lambda$, $a_0$ represents a complex amplitude of a spherical wave which is generated by the sampling point and which has travelled to a receiving plane, D represents a distance between the sampling point and a liquid crystal cell, and $\alpha$ represents an angle between an imaging-order light beam and a zero-order light beam.

In yet another aspect, the present disclosure provides in some embodiments a holographic imaging system, including a processor, a memory and the above-mentioned holographic imaging device. Instructions are stored in the memory and capable of being executed by the processor, so as to: determine an amplitude-transmission coefficient distribution of the holographic imaging device in accordance with a brightness distribution of holographic interference fringes of an object to be displayed; and enable the holographic imaging device to display a holographic image in accordance with the amplitude-transmission coefficient distribution.

In still yet another aspect, the present disclosure provides in some embodiments a computer-readable storage medium storing therein a computer program which is executed so as to: determine an amplitude-transmission coefficient distribution of the above-mentioned holographic imaging device in accordance with a brightness distribution of holographic interference fringes of an object to be displayed; and enable the holographic imaging device to display a holographic image in accordance with the amplitude-transmission coefficient distribution.

BRIEF DESCRIPTION OF THE DRAWINGS

The other features, objects and advantages of the present disclosure will become more apparent with reference to the following drawings.

DETAILED DESCRIPTION OF THE EMBODIMENTS

Figure 1:
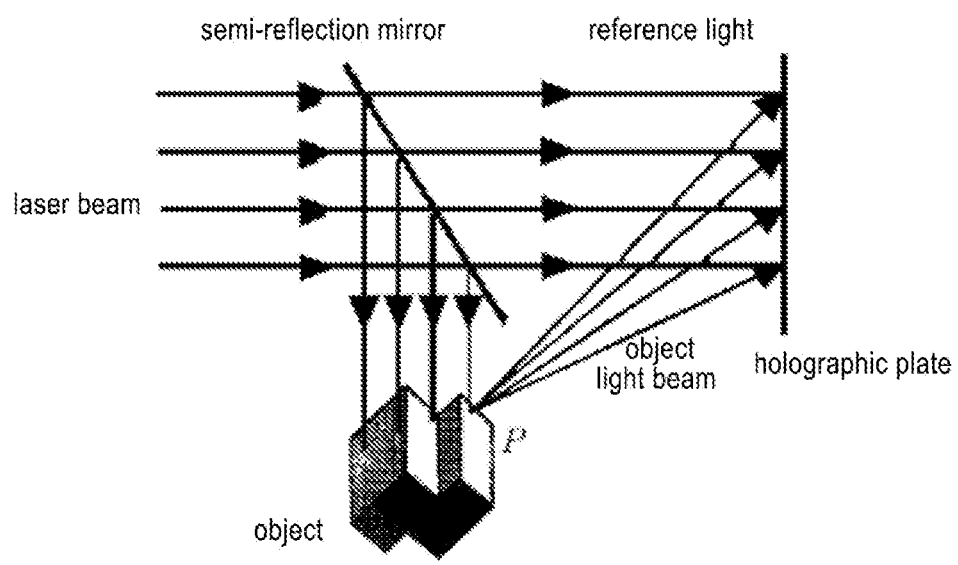
FIG. 1 is a schematic view showing an imaging optical path for a conventional holographic plate.

The present disclosure will be described hereinafter in conjunction with the drawings and embodiments. The following embodiments are for illustrative purposes only, but shall not be used to limit the scope of the present disclosure. It should be appreciated that, for ease of description, merely the portions related to the present disclosure are shown in the drawings.

It should be further appreciated that, the embodiments and the features in the embodiments may be combined in any form in the case of no conflict.

As shown in FIG. 1, for a conventional holographic plate, amplitude information and phase information about an object optical wave are recorded in the form of contrast and brightness change in interference fringes, and then the information is processed, e.g., developed and fixed, so as to form irregular interference fringes, i.e., a holographic image.

Figure 2:
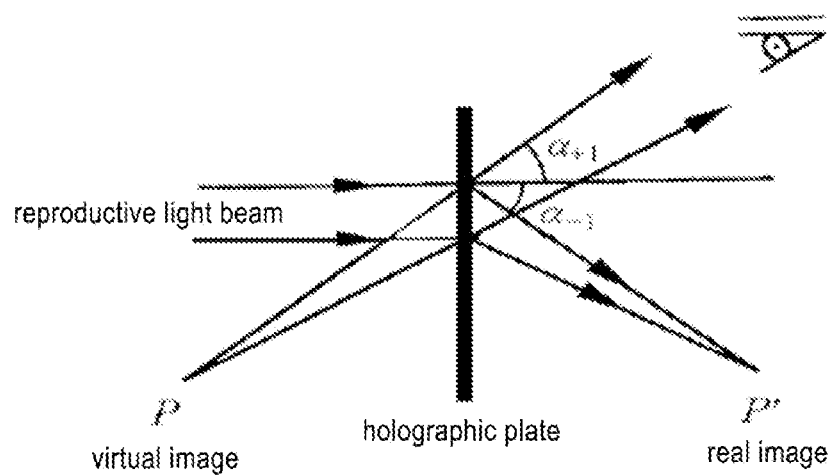
FIG. 2 is a schematic view showing an imaging principle of the conventional holographic plate.

Correspondingly, the conventional holographic imaging device is equivalent to an amplitude-type diffraction grating. FIG. 2 shows an imaging mode. To be specific, the holographic plate is irradiated by a reference optical wave, and in the case of generating the holographic image using a projection light beam, a human eye may view a reproductive image substantially identical to an original object at a position behind the holographic plate where the original object is located.

However, it is impossible for the conventional holographic imaging device to adjust and modify the resultant holographic image, so it is difficult to optimize an imaging effect, let alone the formation of a dynamic holographic image.

Figure 3:
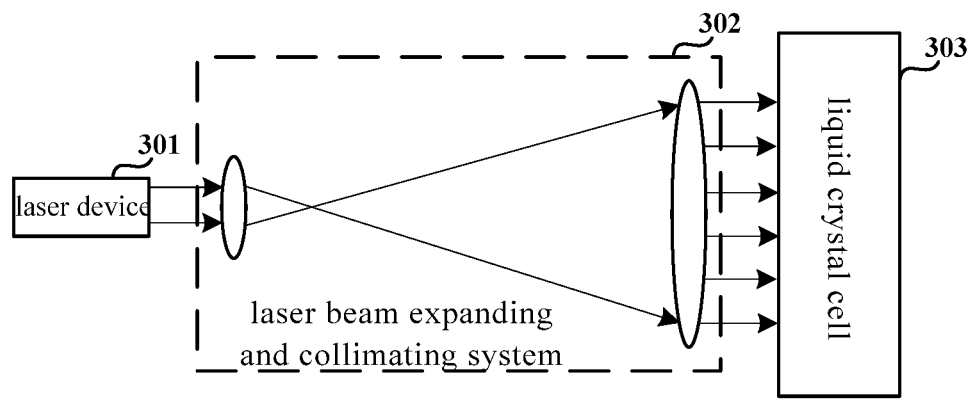
FIG. 3 is a schematic view showing a holographic imaging device according to one embodiment of the present disclosure.

Referring to FIG. 3, the present disclosure provides in some embodiments a holographic imaging device, which includes a laser device 301, a laser beam expanding and collimating system 302 and a liquid crystal cell 303. The laser beam expanding and collimating system 302 is configured to expand a light beam from the laser device 301 and enable the expanded light beam to be transmitted substantially vertically to the liquid crystal cell 303. An amplitude-transmission coefficient distribution of the liquid crystal cell 303 is determined in accordance with a brightness distribution of holographic interference fringes of an object to be displayed.

Because an amplitude-transmission coefficient of the liquid crystal cell 303 is determined in accordance with the brightness distribution of the holographic interference fringes of the object to be displayed, it is able to display the holographic image of the object through the liquid crystal cell 303 in the case that the liquid crystal cell 303 is irradiated by the light beams. In addition, it is able to adjust and modify the resultant holographic image conveniently through adjusting the amplitude-transmission coefficient of the liquid crystal cell 303.

Figure 4:
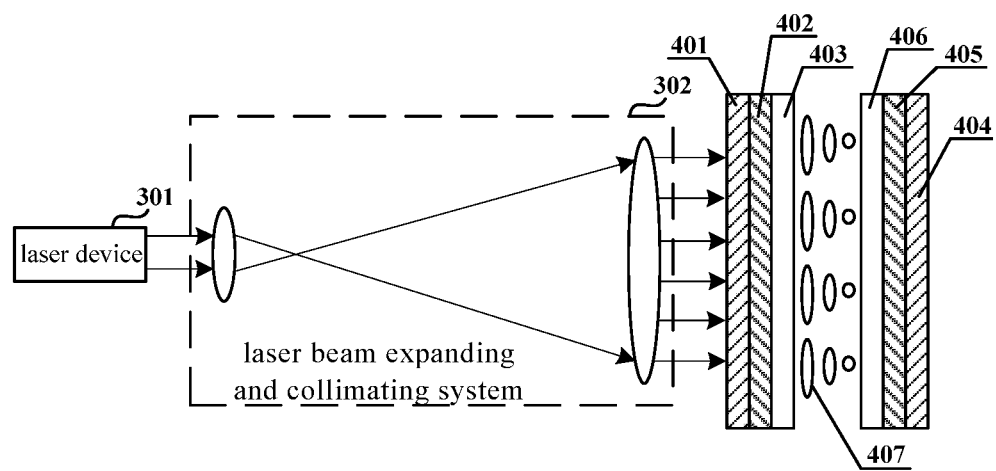
FIG. 4 is another schematic view showing the holographic imaging device according to one embodiment of the present disclosure.

The liquid crystal cell 303 may be in a TN mode, an IPS mode or an FFS mode. In the case that the liquid crystal cell 303 is in the TN mode, as shown in FIG. 4, it may include a first polarizer 401, a first glass substrate 402 arranged on the first polarizer 401, a first transparent electrode layer 403 arranged on the first glass substrate 402, a second polarizer 404, a second glass substrate 405 arranged on the second polarizer 404, a second transparent electrode layer 406 arranged on the second glass substrate 405, and a liquid crystal layer 407 arranged between the first transparent electrode layer 403 and the second transparent electrode layer 406. Correspondingly, the light beam from the laser beam expanding and collimating system 302 is transmitted substantially vertically toward the first polarizer 401, so as to enable the first transparent electrode layer 403 and the second transparent electrode layer 406 to control a deflection direction of liquid crystal molecules in the liquid crystal layer 407, thereby to achieve the amplitude-transmission coefficient distribution.

Due to the existence of a black matrix (BM), the amplitude-transmission coefficient distribution for the formation of the holographic image as well as the imaging quality of the reproductive image may be adversely affected. In order to solve this problem, two microlens array layers may be arranged on the liquid crystal cell for example as shown in FIG. 4. Illustratively but nonrestrictively, the number of microlenses included in the two microlens array layers is the same, and an optical axis of each microlens in one microlens array layer corresponds to that of a corresponding microlens in the other microlens array layer.

Figure 5:
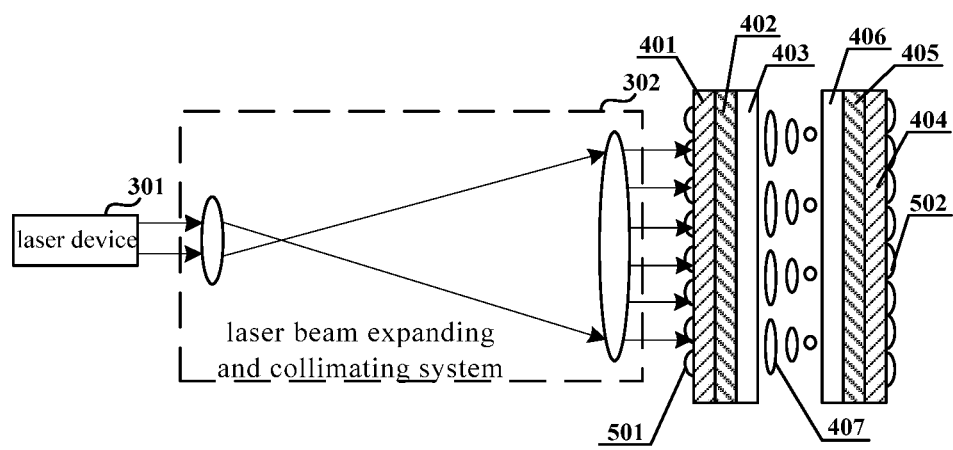
FIG. 5 is yet another schematic view showing the holographic imaging device according to one embodiment of the present disclosure.

As shown in FIG. 5, the liquid crystal cell 303 further includes two microlens array layers arranged at two outer surfaces of the liquid crystal cell respectively. A first microlens array layer 501 is arranged a light-entering side, and each lens unit of the first microlens array layer 501 is located at an opening area of a corresponding pixel. A second microlens array layer 502 is arranged at a light-exiting side, and each lens unit of the second microlens array layer 502 is located on an entire subpixel of a corresponding pixel.

Illustratively and restrictively, the first microlens array layer 501 and the second microlens array layer 502 form an afocal system.

In the case that the liquid crystal cell 303 is in the TN mode as shown in FIG. 4, the first microlens array layer 501 may be arranged on the first polarizer 401, and the second microlens array layer 502 may be arranged on the second polarizer 404.

Figure 6:
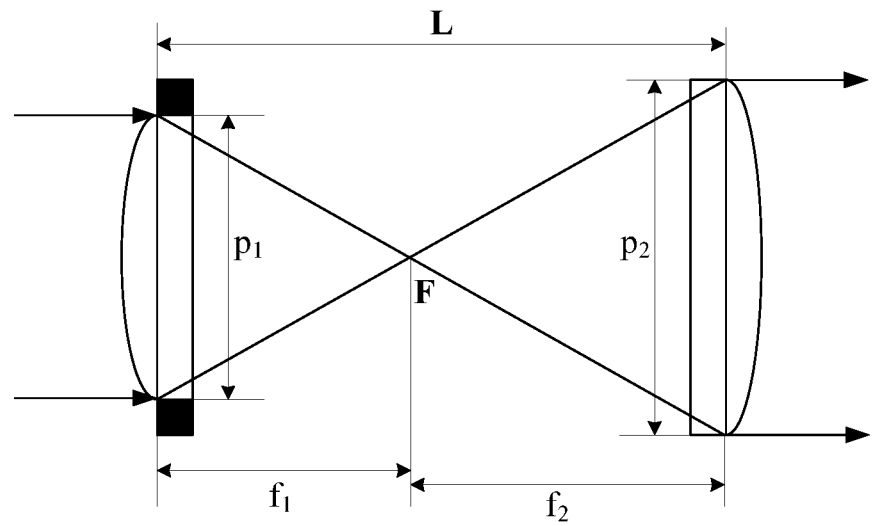
FIG. 6 is a schematic view showing an optical path of a microlens array according to one embodiment of the present disclosure.
Figure 7:
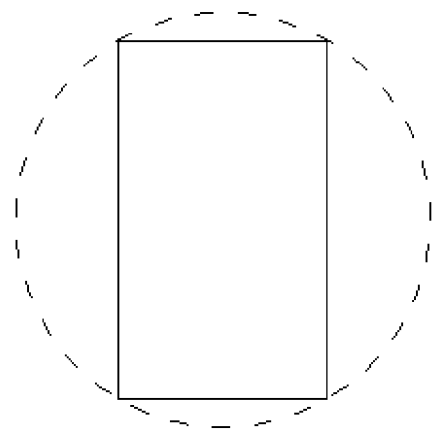
FIG. 7 is a schematic view showing a lens unit of a first microlens array layer according to one embodiment of the present disclosure.

FIG. 6 shows a position relationship between a pair of lens units. Each pair of lens units forms an afocal system (a back focus of each lens unit of the first microlens array layer substantially coincides with a front focus of a corresponding lens unit of the second microlens array layer). In addition, an aperture of each lens unit of the first microlens array layer corresponds to the opening area of each pixel, and an aperture of each lens unit of the second microlens array layer corresponds to each pixel. Because each pixel is of a rectangular shape, each lens unit shall also have a rectangular aperture. As shown in FIG. 7, this is equivalent to the formation of a lens with a rectangular aperture from a lens with a circular aperture (indicated by the dotted line). As shown in FIG. 6, through this structure, it is able to cover the black matrix with the light beams from the laser device, thereby to eliminate the influence of the black matrix on the amplitude-transmission coefficient distribution for the formation of the holographic image.

Illustratively but nonrestrictively, each of the first microlens array layer and the second microlens array layer may include a Fresnel microlens array, so as to reduce a thickness of the liquid crystal cell.

Structural parameters of the two groups of lens units will be calculated as follows.

On the basis of a geometrical relationship, the following two formulae may be acquired:

$$\frac{\frac{p_1}{2}}{f_1} = \frac{\frac{p_1}{2} + \frac{p_2}{2}}{L} \text{ and} \quad (1)$$

$$f_2 = L - f_1, \quad (2)$$

where $p_1$ represents a side length of the aperture of each lens unit of the first microlens array layer, $p_2$ represents a side length of the aperture of each lens unit of the second microlens array layer, $f_1$ represents the back focus of each lens unit of the first microlens array layer, $f_2$ represents the front focus of each lens unit of the second microlens array layer, and L represents a distance between each lens unit of the first microlens array layer and a correspondence lens unit of the second microlens array layer.

On the basis of properties of the lens, the following two formulae may be acquired:

$$f_1 = \frac{n_2 r_1}{n_1 - n_0} \text{ and} \quad (3)$$

$$f_2 = \frac{n_2 r_2}{n_1 - n_0}, \quad (4)$$

where $r_1$ represents a radius of each lens unit of the first microlens array layer, $r_2$ represents a radius of each lens unit of the second microlens array layer, $n_0$ represents a refractive index of air, $n_1$ represents a refractive index of each lens unit of the first microlens array layer and the second microlens array layer, and $n_2$ represents an average refractive index of the liquid crystal cell.

Based on the above analysis, in the case that $p_1$, $p_2$ and L are already known, it is able to acquire values of $f_1$, $f_2$, $r_1$ and $r_2$ through formulae (1), (2), (3) and (4), and then configure the first microlens array layer and the second microlens array layer in accordance with $f_1$, $f_2$, $r_1$ and $r_2$.

Figure 8:
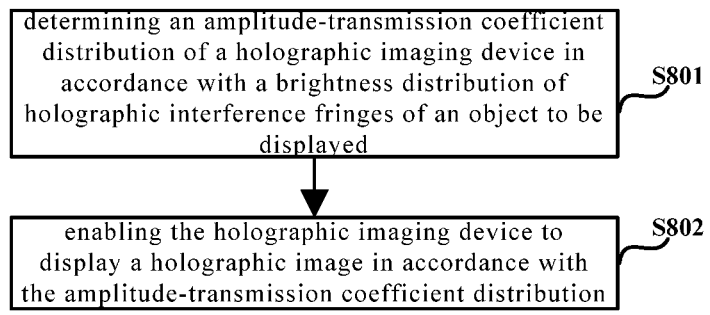
FIG. 8 is a flow chart of a holographic imaging method according to one embodiment of the present disclosure.

Based on the holographic imaging device in FIG. 3, the present disclosure further provides in some embodiments a holographic imaging method which, as shown in FIG. 8, includes: Step S801 of determining an amplitude-transmission coefficient distribution of the holographic imaging device in accordance with a brightness distribution of holographic interference fringes of an object to be displayed; and Step S802 of enabling the holographic imaging device to display a holographic image in accordance with the amplitude-transmission coefficient distribution.

Information about the holographic interference fringes of the object to the displayed may be acquired at first, and then the amplitude-transmission coefficient distribution may be designed in accordance with the brightness distribution of the holographic interference fringes through the liquid crystal cell. The amplitude-transmission coefficient distribution may be substantially identical to the brightness distribution of the holographic interference fringes, or acquired through modification or adjustment on the basis of the brightness distribution of the holographic interference fringes. To be specific, in the amplitude-transmission coefficient distribution, a bright fringe has a maximum transmission coefficient, while a dark fringe has a minimum transmission coefficient, e.g., 0. Through this design, the liquid crystal cell may be equivalent to a holographic plate, i.e., a rectangular amplitude-type diffraction grating. The liquid crystal cell may be irradiated with a reference optical wave substantially identical to that used for calculating the interference fringes, so as to display a holographic image. Because the liquid crystal cell is equivalent to the holographic plate, it is able to dynamically adjust the transmission coefficient corresponding to the interference fringes, thereby to display the holographic image dynamically.

During the design of the amplitude-transmission coefficient distribution and during the display, it is able to adjust the amplitude-transmission coefficient distribution in accordance with a predetermined display effect, thereby to improve the display effect or acquire a dynamic display effect.

Illustratively but nonrestrictively, the amplitude-transmission coefficient distribution may be substantially identical to the brightness distribution of the holographic interference fringes. At this time, Step S801 of determining the amplitude-transmission coefficient distribution of the holographic imaging device in accordance with the brightness distribution of the holographic interference fringes may include: determining the brightness distribution of the holographic interference fringes of the object to be displayed; and enabling an amplitude-transmission coefficient distribution of the above-mentioned holographic imaging device to be substantially identical to the brightness distribution of the holographic interference fringes of the object to be displayed.

The step of determining the brightness distribution of the holographic interference fringes of the object to be displayed may include: sampling the object to be displayed, and determining a plurality of sampling points in the object to be displayed; determining a brightness distribution of the holographic interference fringes with respect to one sampling point; and performing a translation operation in accordance with the brightness distribution of the holographic interference fringes with respect to the sampling point, and determining a brightness distribution of the holographic interference fringes with respect to each of the remaining sampling points in the object to be displayed.

Illustratively but nonrestrictively, in order to achieve a better display effect, among the sampling points, a distance between every two of the sampling points at an identical imaging depth may be smaller than a limiting visual resolution of a human eye, and a difference between parallax angles of every two of the sampling points at different imaging depths may be greater than or equal to a stereoscopic acuity of the human eye.

Illustratively but nonrestrictively, the brightness distribution of the holographic interference fringes with respect to each sampling point in the object to be displayed is a Fresnel zone.

Figure 9:
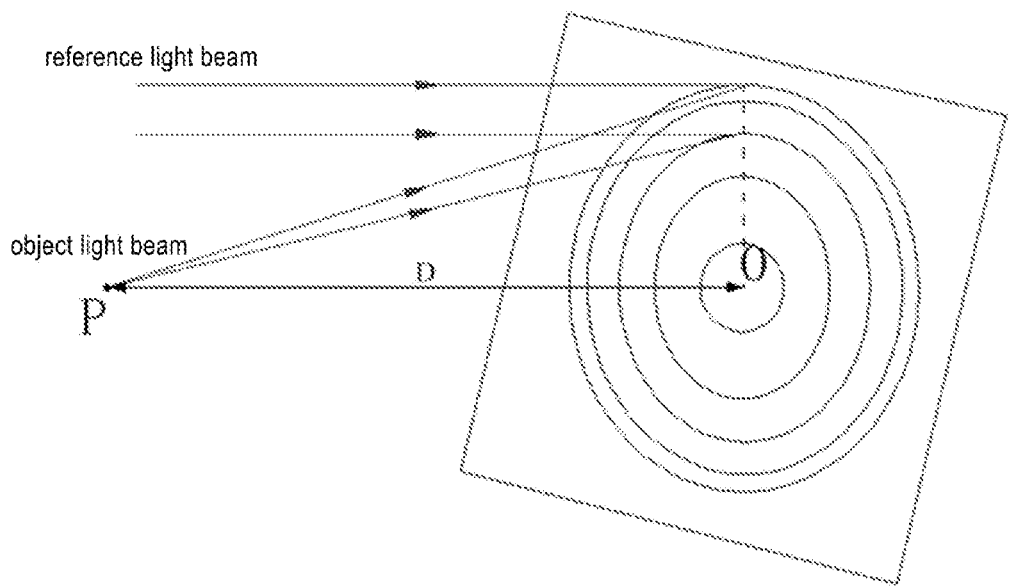
FIG. 9 and FIG. 10 are schematic views showing holographic images with respect to one sampling point according to one embodiment of the present disclosure.
Figure 10:
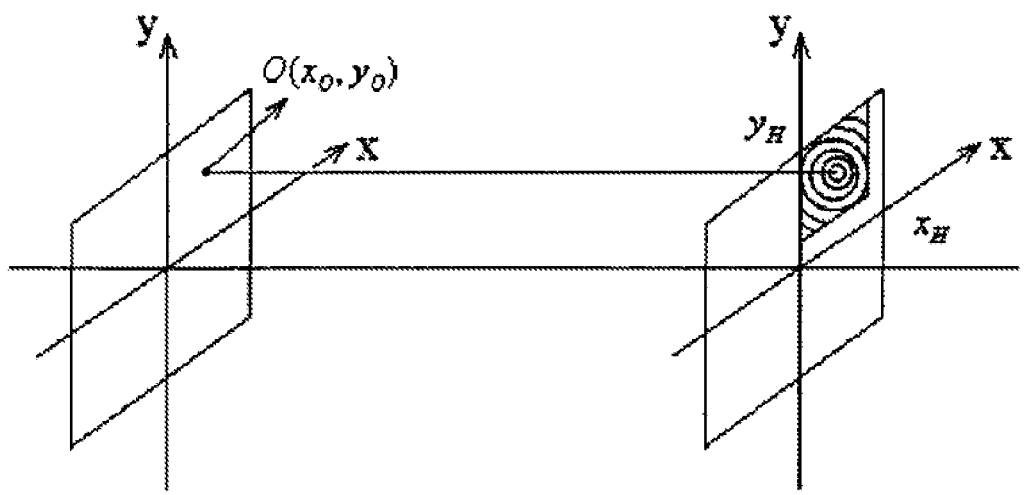

As shown in FIG. 9 and FIG. 10, a holographic image with respect one sampling point is just a Fresnel zone. In the case that all object points on an identical plane at a given diffraction distance are irradiated with a planar optical wave, the resultant Fresnel zones may be identical to each other. Hence, the holographic image may be provided merely by translating and superimposing the Fresnel zone with respect to one sampling point (FIG. 9 merely shows the Fresnel zone with respect to one sampling point).

Figure 11:
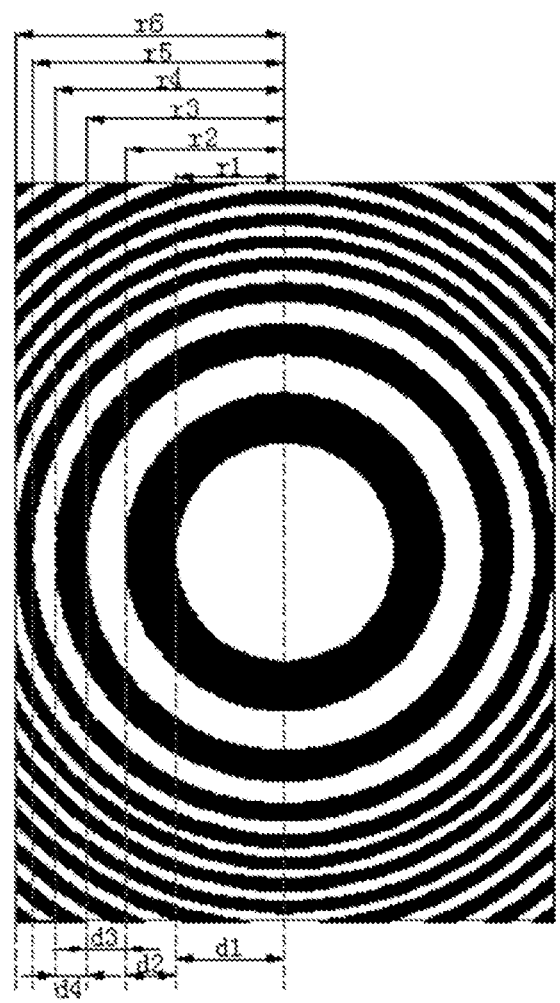
FIG. 11 is a schematic view showing a Fresnel zone according to one embodiment of the present disclosure.

Of course, the Fresnel zones with respect to the object points at different diffraction distances are different from each other, as shown in FIG. 11. A radius of each Fresnel zone may be calculated using the following formula:

$$r_j = \sqrt{jD\lambda} \quad (5),$$

where j represents the number of Fresnel zones, D represents a diffraction distance, and $\lambda$ represents a wavelength of the reference optical wave. A width of each Fresnel zone may be calculated using the following formula:

$$d_j = r_j - r_{j-1} \qquad (6).$$

Based on the above formulae, the distribution of the Fresnel zones is closely related to the diffraction distance D. Table 1 shows the widths of parts of the Fresnel zones at different diffraction distances, where λ is 0.55 μm.

TABLE 1

Widths of parts of Fresnel zones at different diffraction distances

|  | d1 (μm) | d2 (μm) | d3 (μm) | d4 (μm) |
|---|---|---|---|---|
| D = 10 mm | 74.16 | 30.72 | 23.57 | 19.87 |
| D = 100 mm | 234.52 | 97.14 | 74.54 | 62.84 |
| D = 200 mm | 331.66 | 137.38 | 105.41 | 88.87 |
| D = 300 mm | 406.20 | 168.25 | 129.11 | 108.84 |

As shown in Table 1, the Fresnel zones gradually become denser from inside to outside, with their spatial frequencies gradually increasing from inside to outside. The spatial frequency ξ of each Fresnel zone may be calculated using the following formula:

$$\xi = \frac{1}{\Lambda}, \qquad (7)$$

where Λ represents a spatial period of the Fresnel zone, i.e., a distance between two adjacent bright fringes.

Based on Nyquist sampling theorem, the liquid crystal cell may correspond to the complete transmittance distribution of the holographic fringe information merely in the case that $$\xi_{max} \leq \frac{\xi_{LCD}}{2}, \text{ where } \xi_{LCD} = \frac{1}{\Delta x},$$

and Δx represents a width of each subpixel of the liquid crystal cell. Based on the above theorem in combination with formula (7), the following formulae may be acquired:

$$\Lambda_{min} \geq 2\Delta x \text{ and } \Lambda_{min} = d_j + d_{j-1} \qquad (8).$$

Based on the above formulae (8), in the case of a given object distance D, it is able to calculate the number of the holographic fringes or Fresnel zones.

For example, in the case that Δx=50 μm and D=300 mm, Table 2 shows the widths of the Fresnel zones.

TABLE 2

Widths of Fresnel zones in the case that Δx = 50 μm and D = 300 mm (unit: μm)

| d1 | d2 | d3 | d4 | d5 | d6 | d7 | d8 | d9 | d10 |
|---|---|---|---|---|---|---|---|---|---|
| 406.20 | 168.25 | 129.11 | 108.84 | 95.89 | 86.69 | 79.72 | 74.2 | 69.69 | 65.91 |
| d11 | d12 | d13 | d14 | d15 | d16 | d17 | | | |
| 62.70 | 59.91 | 57.46 | 55.29 | 53.34 | 51.59 | 50.01 | | | |

Based on Table 2 in conjunction with formulae (8), in the case that the width of the subpixel of the liquid crystal cell is 50 μm, the number of the Fresnel zones corresponding to an imaging point at an object distance of 300 mm is 17, and the width of each Fresnel zone is shown in Table 2.

Each odd-numbered Fresnel zone corresponds to a bright fringe, and each even-numbered Fresnel zone corresponds to a dark fringe. The liquid crystal cell is used to achieve the amplitude-transmission coefficient distribution of the light beams, and the amplitude-transmission coefficient distribution is substantially identical to the calculated brightness distribution of the holographic interference fringes. To be specific, in the amplitude-transmission coefficient distribution, a bright fringe has a maximum transmission coefficient, while a dark fringe has a minimum transmission coefficient, e.g., 0. Through this design, the liquid crystal cell may be equivalent to a holographic plate. The liquid crystal cell may be irradiated with a reference optical wave substantially identical to that used for calculating the interference fringes, so as to display a holographic image. Because the liquid crystal cell is equivalent to the holographic plate, it is able to dynamically adjust the amplitude-transmission coefficient corresponding to the interference fringes, thereby to display the holographic image dynamically.

In the above calculation, the analysis is merely given on one imaging object point. One holographic image consists of a plurality of object points, and the analysis on the other object points may be performed in a substantially identical way. The Fresnel zones for all the object points may be superimposed so as to acquire the holographic image. In order to enable the human eyes to view the holographic images continuously, a distance between two adjacent sampling points at an identical imaging depth needs to be smaller than a limiting visual resolution of the human eye. In this way, the imaging object points on the reproductive image may be viewed by the human eyes in a continuous rather than discrete manner. In order to provide a stereoscopic holographic image, a difference between parallax angles of every two of the sampling points at different imaging depths needs to be greater than or equal to a stereoscopic acuity of the human eye (a minimum difference between the parallax angles of different object points capable of differentiated by the human eye).

A sampling rule of the adjacent object points will be illustratively described hereinafter.

The sampling rule of the object points at an identical imaging depth will be described as follows.

Figure 12:
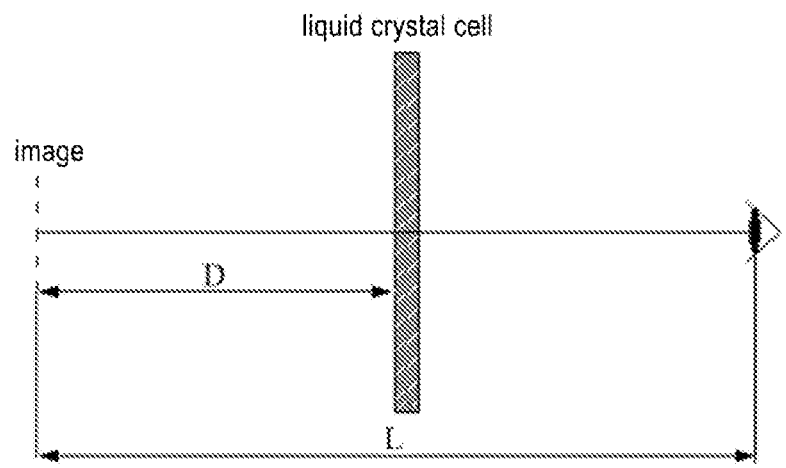
FIG. 12 is a schematic view showing a viewing distance between a human eye and an image plane according to one embodiment of the present disclosure.

As shown in FIG. 12, in the case that a viewing distance between the human eye and an imaging plane is L and a limiting angle of resolution a of the human eye is 1' to 2' (e.g., 2' in a holographic condition), the limiting visual resolution ε of the human eye may be calculated using the following formula:

$$\varepsilon = \alpha * L \qquad (9).$$

In the case that L=600 mm, ε=348 μm. In other words, in the case that a distance between two image points on the image plane is smaller than 348 μm, the two image points may seem like continuous rather than discrete for the human eye. Hence, in the case of calculating the holographic image of a target object, the imaging distance may be 600 mm and the distance between the sampling points may be 0.3 mm.

In addition, the sampling rule of the object points at different imaging depths will be described as follows.

Figure 13:
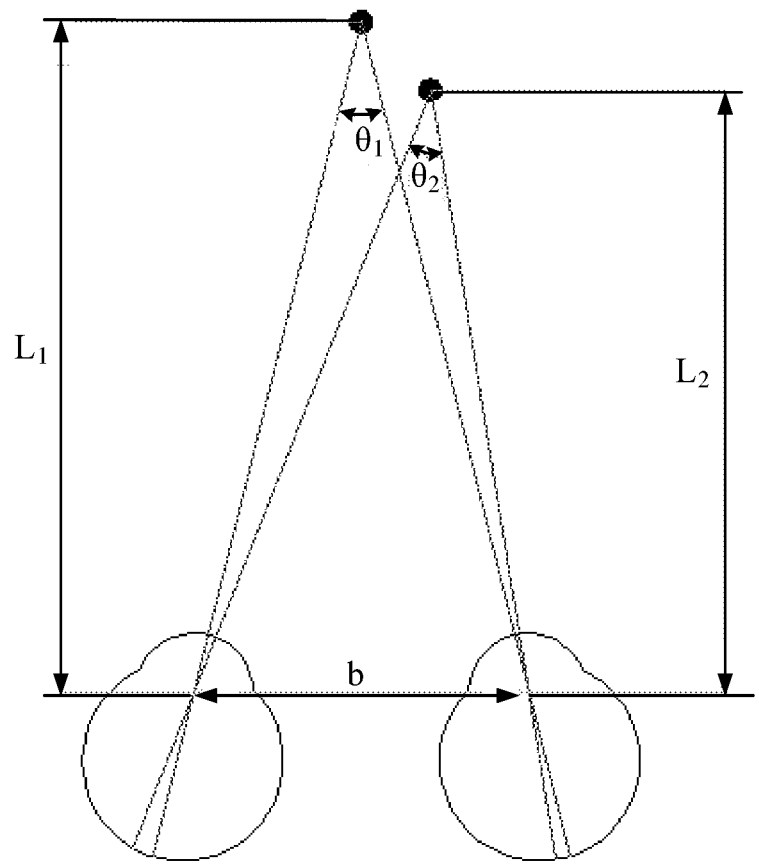
FIG. 13 is a schematic view showing optical paths from the human eye to two object points at different depths according to one embodiment of the present disclosure.

As shown in FIG. 13, $L_1$ and $L_2$ represent distances between the human eye and two object points at different imaging depths respectively, $\theta_1$ and $\theta_2$ represent angles between the human eyes and each of the two object points respectively, b represents an interpupillary distance, and the stereoscopic acuity of the human eye is usually 10". At this time, there are the following formulae:

$$\theta_1 \approx \frac{b}{L_1}, \qquad (10)$$

$$\theta_2 \approx \frac{b}{L_2}, \qquad (11)$$

$$\Delta L = |L_1 - L_2| \text{ and} \qquad (12)$$

$$\Delta\theta = |\theta_1 - \theta_2| \geq 10 \times \frac{\pi}{3600 \times 180}. \qquad (13)$$

In the case that $L_1$=600 mm, b=62 mm, and a minimum distance between the two object points capable of being differentiate by the human eyes is 0.29 mm, i.e., $\Delta L_{min}$=0.29 mm. Hence, the distance between the two object points at different imaging depths may also be 0.3 mm.

Figure 14:
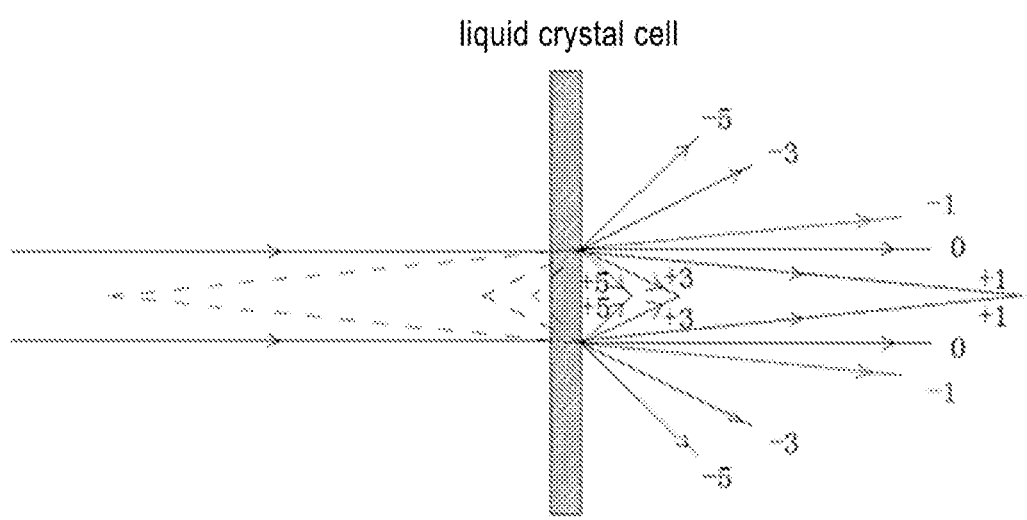
FIG. 14 is a schematic view showing stray light beams generated by a rectangular-amplitude diffraction grating according to one embodiment of the present disclosure.

In the case that the amplitude-transmission coefficient of the liquid crystal cell is substantially identical to the brightness distribution of the interference fringes of the object to be displayed, the holographic imaging device in the embodiments of the present disclosure may be equal t to a rectangular amplitude-type diffraction grating. At this time, during the holographic display, a large number of stray light beams may be generated, and the definition of the resultant holographic image maybe adversely affected. To be specific, FIG. 14 shows the formation of the holographic image with respect to one sampling point, where merely −1-order light beams are imaging light beams. Although the other light beams each have an intensity not greater than −1 order, the definition of the resultant holographic image may still be adversely affected by these light beams.

In order to solve the above problem, the amplitude-transmission coefficient distribution may vary in the form of a cosine function. At this time, the liquid crystal cell may also be equivalent to a holographic plate, i.e., a sinusoidal-amplitude diffraction grating. The liquid crystal cell may be irradiated with the reference optical wave substantially identical to that used for calculating the interference fringes. In addition, the imaging quality of the sinusoidal-amplitude diffraction grating is advantageous over that of the rectangular amplitude-type diffraction grating.

Figure 15:
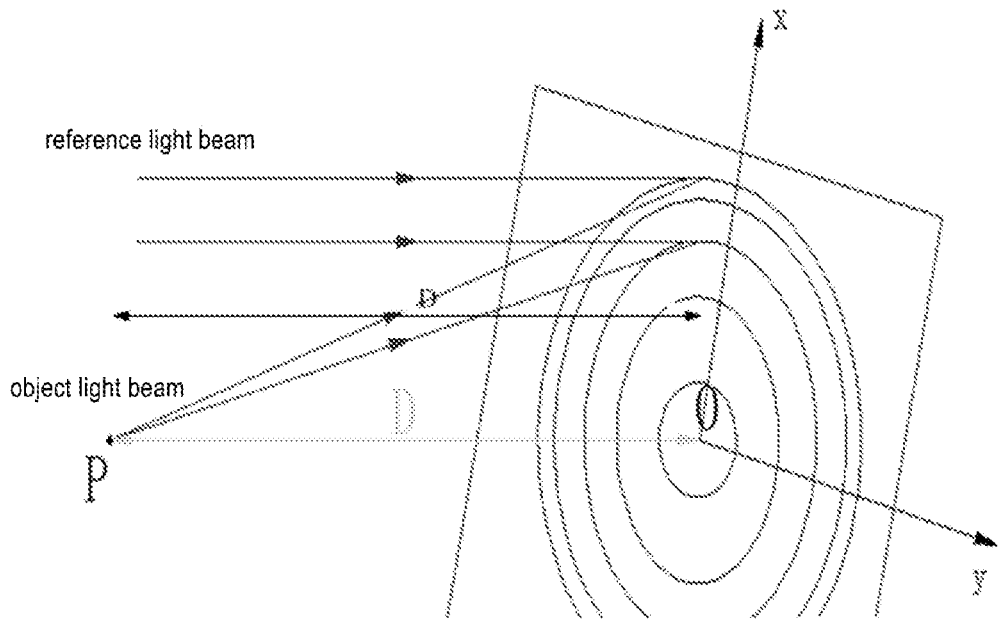
FIG. 15 is a schematic view showing a rectangular coordinate system for an holographic imaging mode according to one embodiment of the present disclosure.

To be specific, a rectangular coordinate system in FIG. 15 may be established, with a central point O of the liquid crystal cell as an origin, and an x axis and a y axis parallel to a long side and a short side of the liquid crystal cell respectively. With a certain object point P, the amplitude-transmission coefficient distribution of the holographic image may be calculated using the following formula:

$$t(x, y) = (|a_0|^2 + 1) + 2a_0\cos\left[\frac{k}{2D}(x^2 + y^2)\right]$$

(14), where k=2π/λ, $a_0$ represents a complex amplitude of a spherical wave which is generated by the sampling point and which has travelled to a receiving plane and it may be approximately a constant, and D represents a distance between the sampling point and the liquid crystal cell.

Figure 16:
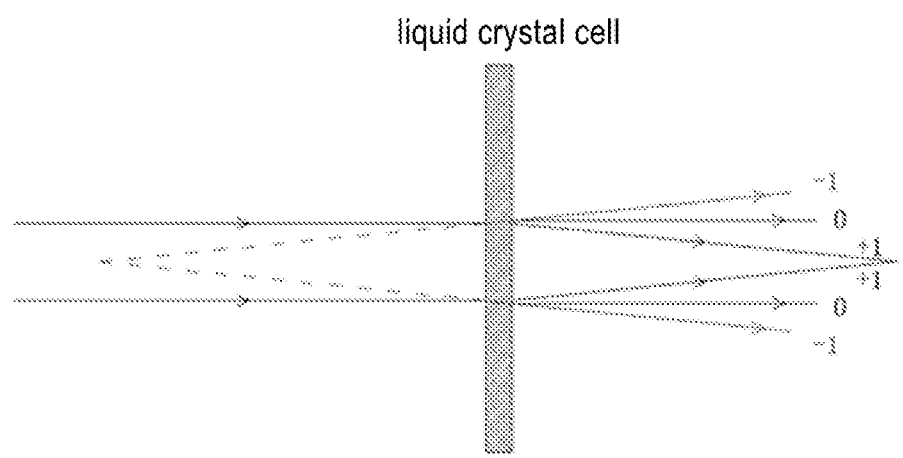
FIG. 16 is a schematic view showing the stray light beams generated by a sinusoidal-amplitude diffraction grating according to one embodiment of the present disclosure.

In the case that the liquid crystal cell is irradiated with the reference optical wave substantially used for calculating the reference fringes, it is able to acquire diffraction light beams in FIG. 16. The diffraction light beams merely include 0-order, +1-order and −1-order light beams, and the −1-order light beams are the imaging light beams. As compared with FIG. 14, the imaging quality of the sinusoidal-amplitude diffraction grating is advantageous over that of the rectangular amplitude-type diffraction grating.

In the above calculation, the analysis is merely given on one imaging object point. One holographic image consists of a plurality of object points, and the analysis on the other object points may be performed in a substantially identical way. The holographic images of all the object points may be superimposed so as to acquire the holographic image corresponding to an entire object space.

In the case that the amplitude-transmission coefficient distribution varies in the form of a cosine function, Step S101 of determining the amplitude-transmission coefficient distribution of the holographic imaging device in accordance with the brightness distribution of the interference fringes of the object to be displayed may include: sampling the object to be displayed, and determining a plurality of sampling points in the object to be displayed; and calculating an amplitude-transmission coefficient distribution of a holographic image with respect to each sampling point using the following formula:

$$t(x, y) = (|a_0|^2 + 1) + 2a_0\cos\left[\frac{k}{2D}(x^2 + y^2)\right], \qquad (14)$$

where k=2π/λ, $a_0$ represents a complex amplitude of a spherical wave which is generated by the sampling point and which has travelled to a receiving plane, and D represents a distance between the sampling point and the liquid crystal cell.

Although the diffraction light beams in FIG. 16 merely include the 0-order, +1-order and −1-order light beams, the −1-order imaging light beams may still be interfered by the 0-order and +1-order light beams. In order to solve this problem, the amplitude-transmission coefficient distribution with respect to each sampling point may be further calculated using the following formula:

$$t(x, y) = (|a_0|^2 + 1) + 2a_0\cos\left[\frac{k}{2D}(x^2 + y^2) - kx\sin\alpha\right], \qquad (15)$$

where k=2π/λ, $a_0$ represents the complex amplitude of the spherical wave which is generated by the sampling point and which has travelled to the receiving plane, and D represents the distance between the sampling point and the liquid crystal cell.

Figure 17:
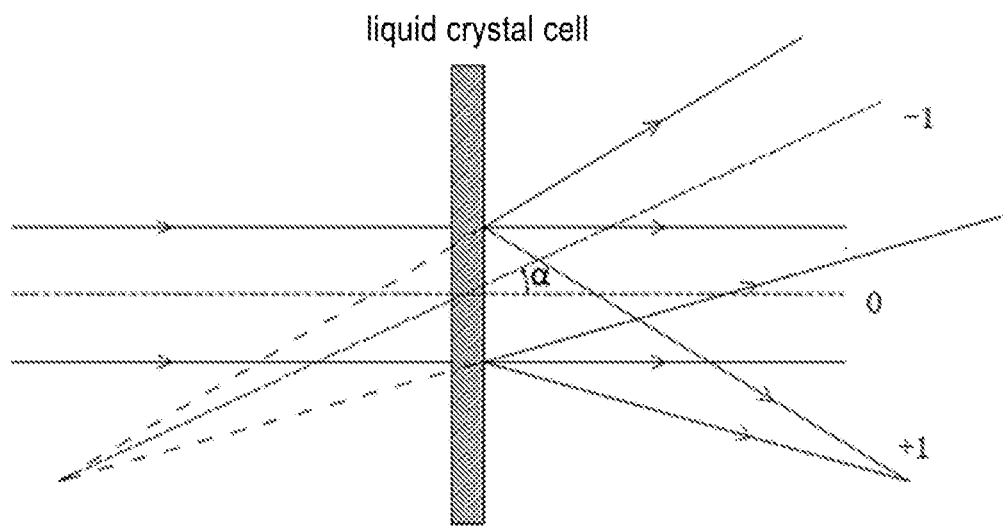
FIG. 17 is another schematic view showing the stray light beams in a better form generated by the sinusoidal-amplitude diffraction grating according to one embodiment of the present disclosure.

In the case that the liquid crystal cell is irradiated with the reference optical wave substantially used for calculating the reference fringes, it is able to acquire diffraction light beams in FIG. 17. Among the diffraction light beams, the 0-order and +1-order light beams are separated from the −1-order imaging light beams. It can be seen that, the imaging quality of the sinusoidal-amplitude diffraction grating in FIG. 17 is advantageous over that in FIG. 16.

It should be appreciated that, although the steps in the method have been described in the drawings in a specific order, it does not require or imply that these steps must be executed in the specific order, or an expected result could be acquired merely by executing all the steps. In contrast, the steps in the flow charts may be executed in any other order. In a possible embodiment of the present disclosure, some of the steps may be omitted, and a plurality of steps may be combined and/or a certain step may be decomposed into a plurality of steps.

Figure 18:
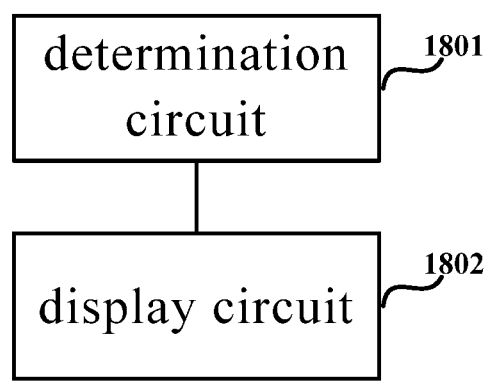
FIG. 18 is another schematic view showing the holographic imaging device according to one embodiment of the present disclosure.

The present disclosure further provides in some embodiments a holographic imaging device which, as shown in FIG. 18, includes: a determination circuitry 1801 configured to determine an amplitude-transmission coefficient distribution in accordance with a brightness distribution of holographic interference fringes of an object to be displayed using the holographic imaging device as shown in FIG. 3; and a display circuitry 1802 configured to display a holographic image in accordance with the amplitude-transmission coefficient distribution using the holographic imaging device as shown in FIG. 3.

The present disclosure further provides in some embodiments a holographic imaging system, including a processor, a memory and the holographic imaging device as shown in FIG. 3. Instructions are stored in the memory and capable of being executed by the processor, so as to implement the above-mentioned holographic imaging method.

To be specific, the above procedure described with reference to FIG. 8 may be implemented as a computer software program. The present disclosure further provides in some embodiments a computer program product including a computer program physically contained in a machine-readable medium and including a program code for executing the method as shown in FIG. 8. At this time, the computer program may be downloaded from a network, and/or installed from a removable medium.

The flow charts and block diagrams show possible system architecture, functions and operation of the system, method and computer program product involved in the embodiments of the present disclosure. In this regard, each block in the flow charts or block diagrams may represent a module, a program segment or a portion of a code, and the module, the program segment or the portion of the code may include one or more executable instructions for achieve prescribed logic functions. It should be appreciated that, in some alternative implementations, the functions indicated in the blocks may also be achieved in an order different from that shown in the drawings. For example, actually the steps indicated by two blocks connected to each other may be executed substantially parallel to each other, or in an opposite order, depending on the functions involved therein. It should be also appreciated that, each block in the block diagrams and/or flow charts, or a combination of the blocks, may be implemented by a specific hardware-based system for executing the prescribed functions or operations, or by specific hardware in conjunction with computer instructions.

The units or modules involved in the embodiments of the present disclosure may be implemented in the form of software or hardware. Also, the units or modules may be arranged in a processor, e.g., the processor may include an XX unit, a YY unit and a ZZ unit. Names of the units or modules shall not be used to limit the units or modules themselves in some cases, e.g., the so-called "XX unit" may also be expressed as "unit for XX".

The present disclosure further provides in some embodiments a computer-readable storage medium which may be included in the above-mentioned system, or arranged separately but not installed in any device. The computer-readable storage medium is configured to store therein one or more programs which are capable of being executed by one or more processors so as to implement the above-mentioned method.

The above are merely examples of embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A holographic imaging device, comprising:
   a laser device;
   a laser beam expanding and collimating system; and
   a liquid crystal cell,
   wherein the laser beam expanding and collimating system is configured to expand a light beam from the laser device and enable the expanded light beam to be transmitted substantially vertically to the liquid crystal cell, and an amplitude-transmission coefficient distribution of the liquid crystal cell is determined in accordance with a brightness distribution of holographic interference fringes of an object to be displayed,
   wherein the liquid crystal cell further comprises two microlens array layers arranged at two outer surfaces of the liquid crystal cell respectively, and the two microlens array layers comprise a first microlens array layer and a second microlens array layer;
   wherein the first microlens array layer is arranged at a light-entering side, and each lens unit of the first microlens array layer is located at an opening area of a corresponding pixel area;
   wherein the second microlens array layer is arranged at a light-exiting side, and each lens unit of the second microlens array layer is located on an entire pixel area of the corresponding pixel area;
   wherein the pixel area refers to a projection area on a plane substantially perpendicular to incident light rays where each lens unit of the second microlens array layer is located, and the opening area of the pixel area refers to a remaining area other than an area occupied by a Black Matrix (BM) within the entire pixel area of the pixel area;
   wherein a number of lens units of the first microlens array layer is the same as a number of lens units of the second microlens array layer; and
   wherein the first microlens array layer and the second microlens array layer form an afocal system configured to enable a first width of incident light rays substantially different from a second width of outgoing light rays.

2. The holographic imaging device according to claim 1, wherein the liquid crystal cell is in a twisted nematic (TN) mode, an in-plane switching (IPS) mode or a fringe field switching (FFS) mode.

3. The holographic imaging device according to claim 2, wherein the liquid crystal cell is in the TN mode, and the liquid crystal cell comprises a first polarizer, a first glass substrate arranged on the first polarizer, a first transparent electrode layer arranged on the first glass substrate, a second polarizer, a second glass substrate arranged on the second polarizer, a second transparent electrode layer arranged on the second glass substrate, and a liquid crystal layer arranged between the first transparent electrode layer and the second transparent electrode layer, wherein the light beam from the laser beam expanding and collimating system is transmitted substantially vertically toward the first polarizer, so as to enable the first transparent electrode layer and the second transparent electrode layer to control a deflection direction of liquid crystal molecules in the liquid crystal layer, thereby to achieve the amplitude-transmission coefficient distribution.

4. The holographic imaging device according to claim 1, wherein a back focus of each lens unit of the first microlens array layer substantially coincides with a front focus of a corresponding lens unit of the second microlens array layer.

5. The holographic imaging device according to claim 1, wherein an aperture of each lens unit of the first microlens array layer corresponds to the opening area of each pixel, and an aperture of each lens unit of the second microlens array layer corresponds to each pixel.

6. The holographic imaging device according to claim 1, wherein each of the first microlens array layer and the second microlens array layer comprises a Fresnel microlens array.

7. The holographic imaging device according to claim 1, wherein the first microlens array layer has a same number of microlenses as the second microlens array layer, and an optical axis of each microlens of the first microlens array layer corresponds to an optical axis of a corresponding microlens of the second microlens array layer.

8. A holographic imaging method, comprising:
   determining an amplitude-transmission coefficient distribution of the holographic imaging device according to claim 1 in accordance with a brightness distribution of holographic interference fringes of an object to be displayed; and
   enabling the holographic imaging device to display a holographic image in accordance with the amplitude-transmission coefficient distribution.

9. The holographic imaging method according to claim 8, wherein the step of determining the amplitude-transmission coefficient distribution of the holographic imaging device in accordance with the brightness distribution of the holographic interference fringes comprises:
   determining the brightness distribution of the holographic interference fringes of the object to be displayed; and
   enabling an amplitude-transmission coefficient distribution of the holographic imaging device to be substantially identical to the brightness distribution of the holographic interference fringes of the object to be displayed.

10. The holographic imaging method according to claim 9, wherein the step of determining the brightness distribution of the holographic interference fringes of the object to be displayed comprises:
   sampling the object to be displayed, and determining a plurality of sampling points in the object to be displayed;
   determining a brightness distribution of the holographic interference fringes with respect to one sampling point of the plurality of sampling points; and
   performing a translation operation in accordance with the brightness distribution of the holographic interference fringes with respect to the sampling point, and determining a brightness distribution of the holographic interference fringes with respect to each of the remaining sampling points of the plurality of sampling points in the object to be displayed.

11. The holographic imaging method according to claim 10, wherein among the sampling points, a distance between every two of the sampling points at an identical imaging depth is smaller than a limiting visual resolution of a human eye, and a difference between parallax angles of every two of the sampling points at different imaging depths is greater than or equal to a stereoscopic acuity of the human eye.

12. The holographic imaging method according to claim 8, wherein the amplitude-transmission coefficient distribution varies in the form of a cosine function.

13. The holographic imaging method according to claim 8, wherein the brightness distribution of the holographic interference fringes with respect to each sampling point in the object to be displayed is a Fresnel zone.

14. The holographic imaging method according to claim 8, wherein the step of determining the amplitude-transmission coefficient distribution of the holographic imaging device in accordance with the brightness distribution of the interference fringes of the object to be displayed comprises:
   sampling the object to be displayed, and determining a plurality of sampling points in the object to be displayed; and
   calculating an amplitude-transmission coefficient distribution of a holographic image with respect to each sampling point of the plurality of sampling points using the following formula:

$$t(x, y) = (|a_0|^2 + 1) + 2a_0\cos\left[\frac{k}{2D}(x^2 + y^2)\right],$$

where $k=2\pi/\lambda$, $a_0$ represents a complex amplitude of a spherical wave which is generated by the sampling point and which has travelled to a receiving plane, and D represents a distance between the sampling point and a liquid crystal cell.

15. The holographic imaging method according to claim 8, wherein the step of determining the amplitude-transmission coefficient distribution of the holographic imaging device in accordance with the brightness distribution of the interference fringes of the object to be displayed comprises:
   sampling the object to be displayed, and determining a plurality of sampling points in the object to be displayed; and
   calculating an amplitude-transmission coefficient distribution of a holographic image with respect to each sampling point of the plurality of sampling points using the following formula:

$$t(x, y) = (|a_0|^2 + 1) + 2a_0\cos\left[\frac{k}{2D}(x^2 + y^2) - kx\sin\alpha\right],$$

where $k=2\pi/\lambda$, $a_0$ represents a complex amplitude of a spherical wave which is generated by the sampling point and which has travelled to a receiving plane, D represents a distance between the sampling point and a liquid crystal cell, and $\alpha$ represents an angle between an imaging-order light beam and a zero-order light beam.

16. A holographic imaging system, comprising a processor, a memory and the holographic imaging device according to claim 1, wherein instructions are stored in the memory and capable of being executed by the processor, so as to cause the processor to: determine an amplitude-transmission coefficient distribution of the holographic imaging device in accordance with a brightness distribution of holographic interference fringes of an object to be displayed; and enable the holographic imaging device to display a holographic image in accordance with the amplitude-transmission coefficient distribution.

17. A non-transitory computer-readable storage medium storing therein a computer program, which is executable by a processer so as to cause the processor to: determine an amplitude-transmission coefficient distribution of the holographic imaging device according to claim 1 in accordance with a brightness distribution of holographic interference fringes of an object to be displayed; and enable the holographic imaging device to display a holographic image in accordance with the amplitude-transmission coefficient distribution.

* * * * *